United States Patent [19]

Yang

[11] Patent Number: 5,208,709
[45] Date of Patent: May 4, 1993

[54] DIGITAL MAGNETIC RECORDING/REPRODUCING AMPLIFYING APPARATUS

[75] Inventor: Chang-jin Yang, Seoul, Rep. of Korea

[73] Assignee: Samsung Electronics Co., Ltd., Kyunggi, Rep. of Korea

[21] Appl. No.: 670,037

[22] Filed: Mar. 15, 1991

[51] Int. Cl.$^5$ ............................................. G11B 5/09
[52] U.S. Cl. ........................................ 360/64; 360/68
[58] Field of Search ...................... 360/64, 65, 67, 68, 360/32

[56] References Cited

U.S. PATENT DOCUMENTS 3,099,708  7/1963  Smith ..................................... 360/64

*Primary Examiner*—Vincent P. Canney
*Attorney, Agent, or Firm*—Morgan & Finnegan

[57] ABSTRACT

A digital magnetic recording/reproducing amplifying apparatus which includes a recording amplifying portion, a first reproducing amplifying portion, a switching portion, and a second reproducing amplifying portion. The apparatus has the advantage of uniform performance by a more simply defined recording current waveform with variable resistance and by performing a two-stage amplification while simultaneously reducing the number of amplifiers by half.

1 Claim, 5 Drawing Sheets

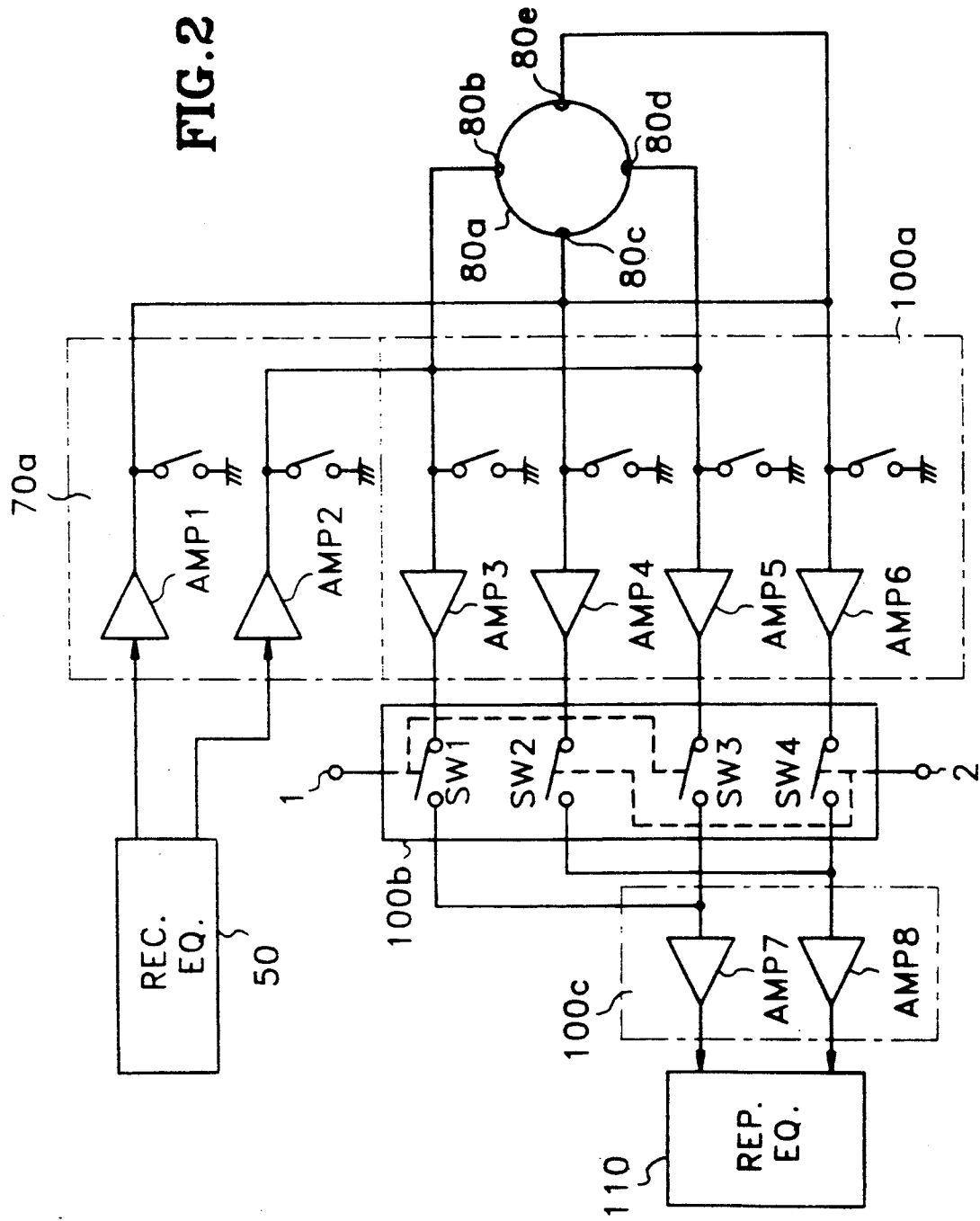

FIG.4 (CONT.)
(E) 
(F) 
(G) 
(H) 
(J) 
(K) 
(L) 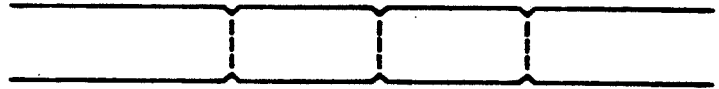

DIGITAL MAGNETIC RECORDING/REPRODUCING AMPLIFYING APPARATUS

FIELD OF THE INVENTION

The present invention relates to a data recording/reproducing amplifying apparatus for digital video tape recorders (VTRs), and more particularly to a data recording/reproducing amplifying apparatus for recording and reproducing large quantities of data.

BACKGROUND OF THE INVENTION

A conventional digital VTR system is shown in FIG. 1 in which analog video signals inputted via input terminal IN(1) are converted to digital signals in an analog/digital converter 10 of an input portion A and are transmitted to a synchronizer 40 through a first error corrector 20 and a modulator 30. During this operation, a clock generator 60 generates clock signals from a reference signal inputted via input terminal IN(3) and transmits the clock signals to the first error corrector 20, modulator 30, and a synchronizer 40. The synchronizer 40 adds the clock signals generated from the clock generator 60 to signals received from the modulator 30. The resultant signal is supplied to head 80 through a recording equalizer 50 and a recording amplifier 70. A head 80 converts the signals amplified in the recording amplifier 70 into a current waveform and records it on tape 90.

In order to reproduce the signals recorded on the tape 90, the signals are changed to electric signals by the head 80, then are amplified by a reproducing amplifier 100. After that, the signals pass through a reproducing equalizer 110, a pulse detector 120, a synchronizing detector 130, a demodulator 140, a TBC (Time Base Corrector) 150, and a second error corrector 170 all of which constitute an output portion, and then the signals are converted into analog signals by a digital/analog converter 180. During this operation, a clock reproducer 160 receives output signals from the reproducing equalizer 110 and reproduces clock signals which are then applied to the pulse detector 120, synchronizing detector 130, demodulator 140 and TBC 150. Input terminal IN2 and output terminal OUT2 are used when digital video signals are directly inputted or outputted.

Conventional digital VTR systems, however, have a problem in that the recording amplifier 70 and reproducing amplifier 100 have overly complicated circuitry to precisely record digital signals on the tape 90.

OBJECT OF THE INVENTION

Therefore, it is an object of the present invention to provide a data recording and reproducing/amplifying apparatus having simpler circuitry than a conventional one yet maintaining performance characteristics of a conventional one.

SUMMARY OF THE INVENTION

To accomplish these and other objects, a digital VTR system is provided which includes an input portion which receives analog video signals and converts them to digital video signals, an output portion which converts the digital video signals to analog video signals, a clock signal generator which supplies clock signals to the input and output portions according to the reference input, and a clock reproducer provided in the output portion. Preferred embodiments of the invention also include: a recording amplifying portion for converting digital signals outputted from the recording equalizer into current signals; a first reproducing amplifying portion which amplifies and outputs current signals recorded on a tape and detected by a plurality of heads; a switching portion which switches signals received from the first reproducing amplifying portion; and a second reproducing amplifying portion which again amplifies the output signals from the first reproducing amplifier, through selected switches in the switching portion and then supplies the resultant signals to the reproducing equalizer of the output portion, thereby amplifying the signals.

BRIEF DESCRIPTION OF THE DRAWINGS

The invention will be described in greater detail below with reference to the attached drawings, in which:

FIG. 2 is a schematic illustration of a digital magnetic recording and reproducing/amplifying apparatus according to the present invention;

DETAILED DESCRIPTION OF THE INVENTION

Figure 1:
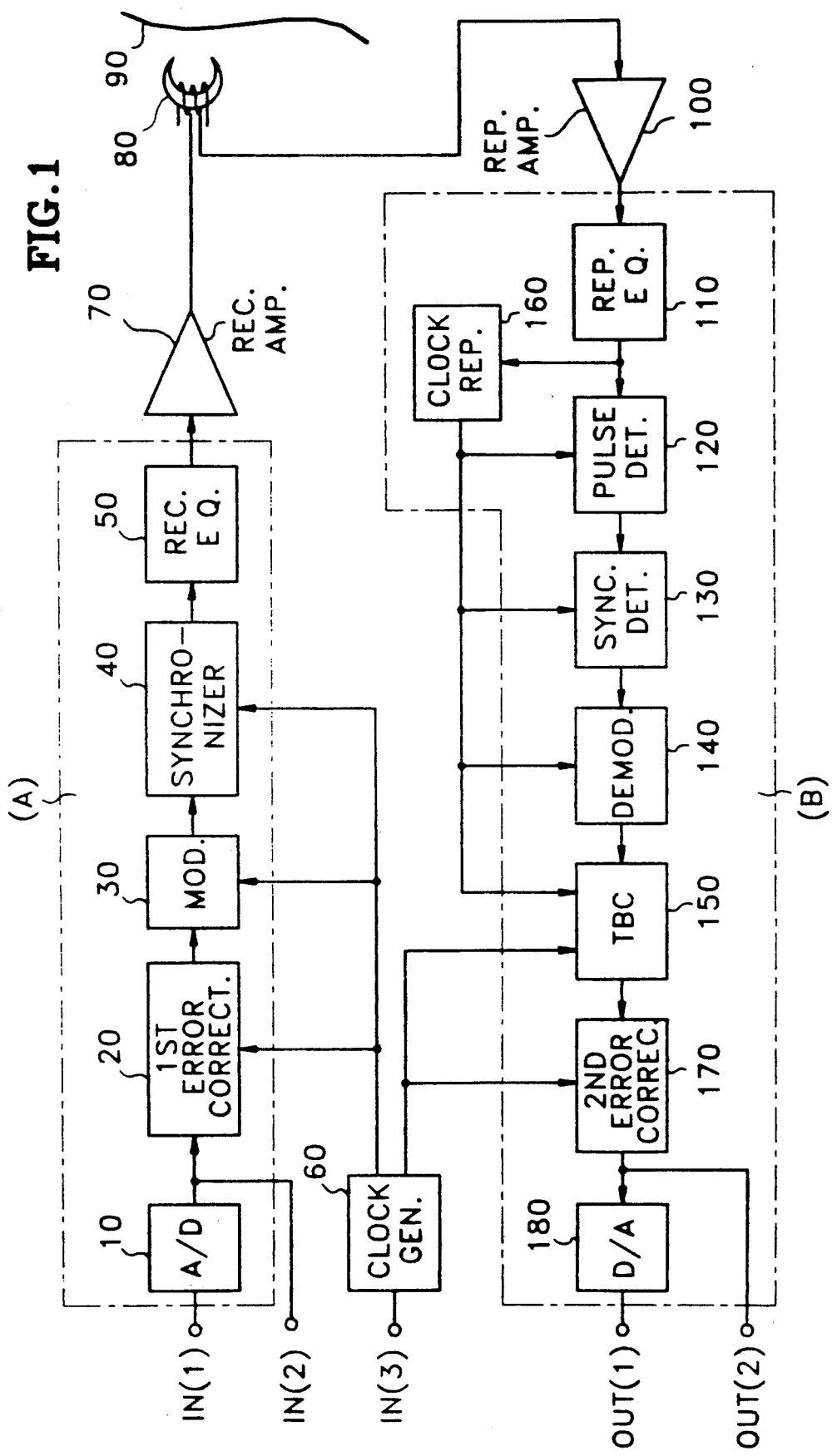
FIG. 1 is a block diagram of a conventional digital VTR system.

Referring to FIG. 2, a recording amplifying portion 70a of an apparatus according to the invention includes amplifiers AMP1 and AMP2 which are connected to and amplifying the output of the recording equalizer 50 of the input portion A shown in FIG. 1. Four heads 80b, 80c, 80d, and 80e, are attached to a drum 80a for recording or reproducing signals on the tape 90 as shown in FIG. 1. The four heads are also connected to the output terminals of amplifiers AMP1 and AMP2 of the recording amplifying portion 70a, with heads 80c and 80e driven by AMP1 and heads 80b and 80d driven by AMP2 respectively. Within a first reproducing amplifying portion 100a, reproducing amplifiers AMP3, AMP4, AMP5 and AMP6 are respectively connected to heads 80b, 80c, 80d and 80e of the drum 80a for amplifying detected signals. A switching portion 100b having switches SW1, SW2, SW3 and SW4 for switching signals outputted from the reproducing amplifiers AMP3 and AMP4 and signals outputted from the reproducing amplifiers AMP5, AMP6 is connected to each reproducing amplifier's output terminal. The switches SW1, SW2, SW3 and SW4 of the switching portion 100b are also connected to a second reproducing amplifying portion 100c having amplifiers AMP7 and AMP8 which amplify signals selectively switched and supply the signals to the reproducing equalizer 100 of the output portion B, as shown in FIG. 1.

Figure 3A:
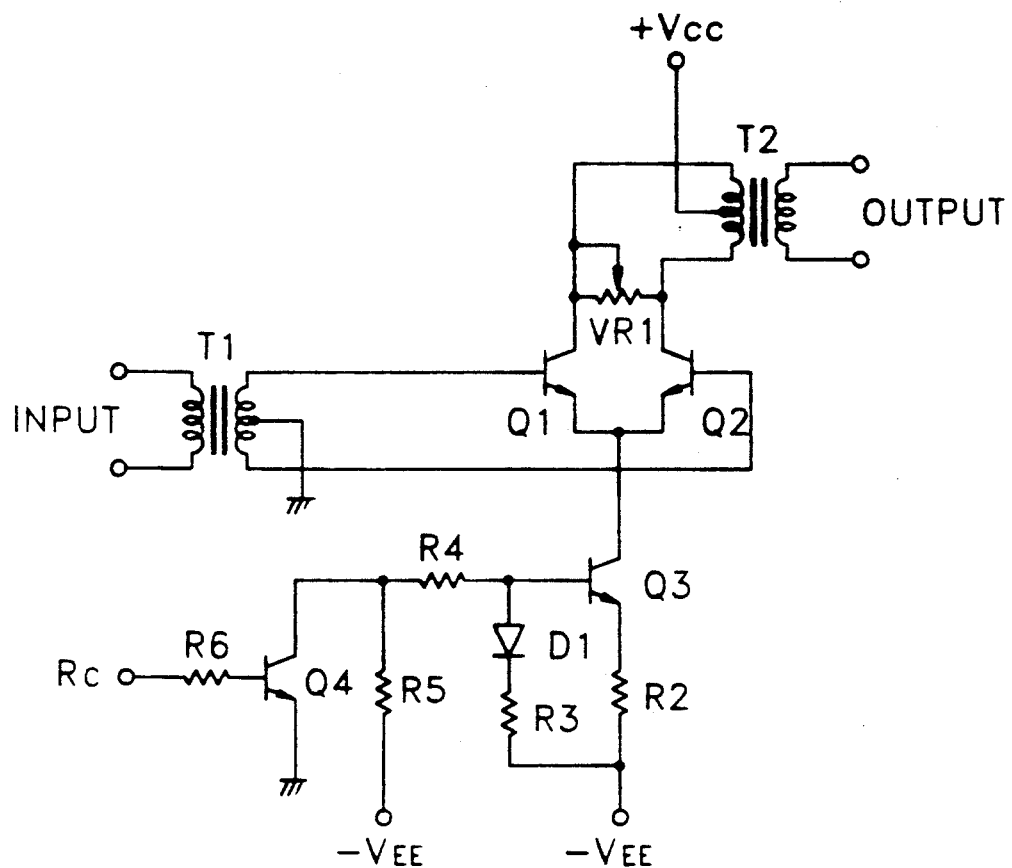
FIG. 3A is a detailed schematic of a recording amplifier according to the present invention.
Figure 3B:
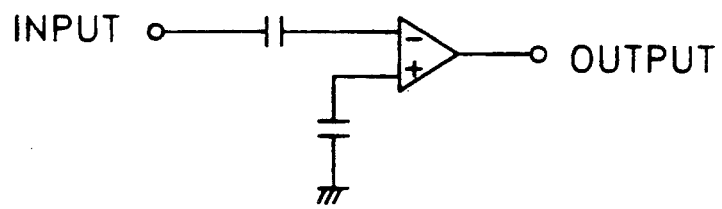
FIG. 3B is a detailed schematic of a reproducing amplifier of the present invention.
Figure 4:
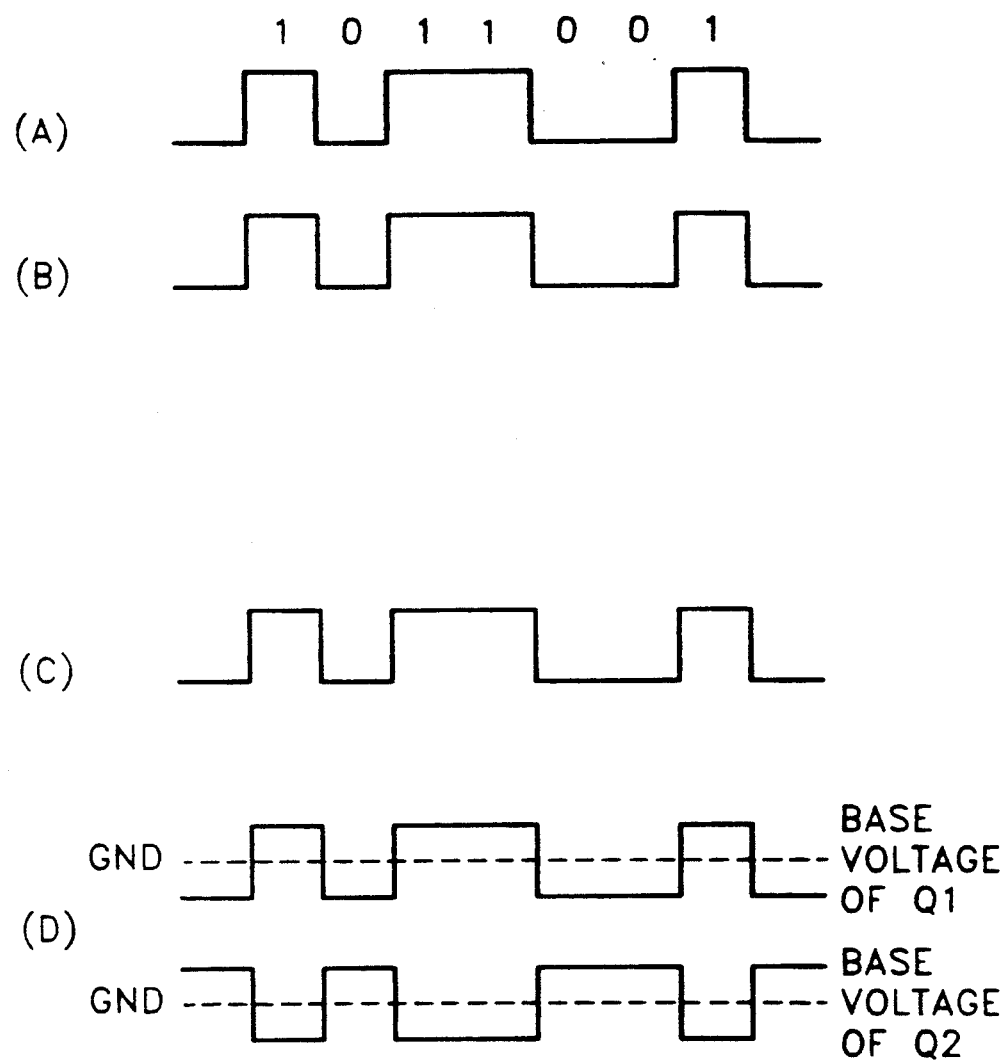
FIGS. 4A to 4L are waveforms present in a digital magnetic recording and reproducing/amplifying apparatus as shown in FIG. 2.

The following is a more detailed description of the invention referring to FIGS. 2, 3 and 4.

As shown in FIG. 2, supplying digital signals as shown in FIG. 4A, which are outputted from recording equalizer 50 of FIG. 1 to heads 80b, 80c, 80d and 80e mounted on drum 80a, recording amplifiers AMP1 and AMP2 convert the digital signals to the current waveform of FIG. 4B. Amplifier AMP1 drives the heads 80b, and 80d and amplifier AMP2 drives the heads 80c, and 80e.

Referring to FIG. 3A, digital data transmitted from the recording equalizer 50 is applied to transformer T1 as the waveform of FIG. 4C and is then converted to balanced signals. The balanced signals outputted from transformer T1 are supplied to the base of transistors Q1 and Q2.

The balance signals as shown in FIG. 4D turn the above transistors on and off. A constant current circuit composed of transistor Q3, resistances R2, R3 and R4, and diode D1 maintain a constant current to a transformer T2 through transistors Q1 and Q2.

Transistor Q4 and resistances R5 and R6 are controlled by a recording control signal Rc in such a manner that amplifiers AMP1 and AMP2 only operate when recording and do not operate when reproducing. Combined with the inductance of transformer T2, variable resistance VR1, which is connected to collectors of the transistors Q1 and Q2, is used to shape a current waveform whose rise and fall time ($\tau$) is determined by the values of the inductance L of transformer T2 and resistance R of variable resistance VR1. The formula is as follows:

$$\tau = \frac{L}{R}$$

A current square wave outputted to output terminal OUTPUT and following the above formula is controlled as shown in FIG. 4G to improve transient response characteristics during rise time and fall time. FIG. 4E shows the current square wave when a transient response is excessive and FIG. 4F shows when a transient response arrives at its normal state in haste.

In order to reproduce data recorded on tape 90 by the heads, 80c, 80e, 80b, and 80d, which are mounted on drum 80a, input terminals of reproducing amplifiers AMP3, AMP4, AMP5 and AMP6 are connected to heads 80b, 80c, 80d and 80e, respectively, to amplify the recorded signal. Then, using switching portion 100b, the outputs of amplifiers AMP3 and AMP4 or amplifiers AMP5 and AMP6 are alternately selected.

Control signal waveforms supplied to terminals 1 and 2 of the switching portion 100b are shown in FIGS. 4H and 4J which control the output signals from the reproducing amplifiers AMP3, AMP4, AMP5 and AMP5, and which is transmitted to reproducing equalizer 110 via reproducing amplifiers AMP7 and AMP8, as the waveforms shown in FIGS. 4K and 4L. The reproducing amplifiers AMP3, AMP4, AMP5, AMP6, AMP7 and AMP8 all have the same circuit structure as the reproducing amplifier shown in FIG. 3B.

The present invention has an advantage of uniform performance during digital magnetic recording, by more simply shaping the recording current waveform with a variable resistance, and also improved performance during reproducing, by performing a two-stage amplification while reducing the number of amplifiers by half.

We claim:

1. A digital magnetic recording/reproducing amplifying apparatus in a digital VTR system comprising:
    an input portion which receives analog video signals and converts them to digital video signals;
    an output portion which converts the digital video signals to the analog video signals;
    a recording amplifying portion for amplifying signals outputted from a recording equalizer in said input portion;
    a first reproducing amplifying portion for amplifying output current signals when signals recorded on tape are detected and outputted via a plurality of heads fixed on a drum;
    a switching portion for selectively switching signals transmitted from said first reproducing amplifying portion; and
    a second reproducing amplifying portion for amplifying the output signal of said first reproducing amplifier switched selectively in said switching portion, and for transmitting it to the reproducing equalizer in said output portion;
    wherein said recording amplifying portion comprises:
        a first transformer which converts output signals of said recording equalizer to balance signals;
        a second transformer for generating head recording signals;
        transistors for supplying constant current to said second transformer with said transistors controlled by the output of said first transformer;
        a variable resistance provided between said second transformer and transistors for shaping the output of said second transformer;
        a constant current circuit connected to said transistors; and
        a control portion for controlling said constant current circuit by a recording control signal.

* * * * *